US008095979B2

(12) United States Patent
McDermott et al.

(10) Patent No.: US 8,095,979 B2
(45) Date of Patent: Jan. 10, 2012

(54) ANALYSIS OF EVENT INFORMATION TO PERFORM CONTEXTUAL AUDIT

(75) Inventors: Ellen McDermott, Clyde Hill, WA (US); Efim Hudis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 11/627,594

(22) Filed: Jan. 26, 2007

(65) Prior Publication Data

US 2008/0184058 A1    Jul. 31, 2008

(51) Int. Cl.
G06F 11/00    (2006.01)
(52) U.S. Cl. .............. 726/22; 709/225; 709/224; 714/2; 705/44
(58) Field of Classification Search ................ 705/7, 44; 714/2; 709/224–225; 370/389; 726/22
See application file for complete search history.

(56) References Cited

U.S. PATENT DOCUMENTS

| 5,740,361 | A * | 4/1998 | Brown ............................. 726/5 |
| 6,484,203 | B1 * | 11/2002 | Porras et al. .................... 709/224 |
| 7,043,727 | B2 | 5/2006 | Bennett et al. ................. 718/100 |
| 7,107,340 | B2 | 9/2006 | Chkodrov et al. ............. 709/224 |
| 2002/0052948 | A1 | 5/2002 | Baudu et al. ................... 709/224 |
| 2002/0062237 | A1 | 5/2002 | Matsumoto et al. ............. 705/7 |
| 2003/0012066 | A1 | 1/2003 | Poechmueller ............... 365/200 |
| 2003/0193960 | A1 | 10/2003 | Land |
| 2004/0100566 | A1 | 5/2004 | Valleriano et al. ....... 348/231.99 |
| 2004/0215715 | A1 | 10/2004 | Ehrich et al. .................. 709/203 |
| 2005/0093976 | A1 | 5/2005 | Valleriano et al. ............ 348/143 |
| 2005/0171810 | A1 | 8/2005 | Klein et al. ....................... 705/1 |
| 2007/0121626 | A1 * | 5/2007 | Shepard ......................... 370/389 |

OTHER PUBLICATIONS

Flegel, U., "Pseudonymizing Unix Log Files", http://ls6-www.informatick.uni-dortmund.de/issi/archive/literature/2002/Flegel:2002a.pdf, 30 pages.
Pickel, J. et al., "Enabling Automated Detection of Security Events that affect Multiple Administrative Domains", 2000, 128 pages, http://aircert.sourceforge.net/docs/pickel_danyliw_thesis.pdf.
Price, K.E., "Host-Based Misuse Detection and Conventional Operating Systems" Audit Data Collection, A Thesis Submitted to the Faculty of Purdue University, Dec. 1997.
Pusara, M. et al., "User Re-Authentication via Mouse Movements", VizSEC/DMSEC, 2004, http://delivery.acm.org, 8 pages.

* cited by examiner

Primary Examiner — Thanhnga Truong
Assistant Examiner — Angela Holmes
(74) Attorney, Agent, or Firm — Woodcock Washburn LLP (57) ABSTRACT

Analysis of audit information that takes into account a wide context allows for a rich picture from which system conditions may be assessed. Event information about various events that have occurred or are occurring, on various sources in the computing arrangement, is maintained. Each entity has an "activity identifier", which remains the same across various events performed by that entity at the various sources. Event information associated with the various sources is contextually analyzed on the basis of the activity identifier, to assess whether a condition exists that impacts the performance and/or security of the computing arrangement. In case it is determined that such a condition exists, an action is performed to remediate the condition.

20 Claims, 4 Drawing Sheets

ANALYSIS OF EVENT INFORMATION TO PERFORM CONTEXTUAL AUDIT

BACKGROUND

In a computing environment, auditing is typically performed in order to determine such facts as logon, data access, or other security-relevant events, or to detect past or ongoing attacks. Typically, machines, and the programs that run on them, record event logs, and these event logs can be analyzed to determine conditions that are, or were, present at the machine; event monitoring typically captures data such as system status or system performance.

Auditing is typically done on a per-machine, or per-entity basis—i.e., the event log generated by one machine, or by one entity (e.g., by a particular program running on one machine) is analyzed to determine whatever information can be gleaned from that one machine or entity. However, the overall picture of what occurs on a machine is not always apparent from one log, because a single log does not typically contain the information that describes an actual usage scenario. In a more typical usage scenario, a user logs onto a computer and runs several programs on that computer. Each of the programs, in turn, may access other servers (e.g., database servers, mail servers, etc.), and these servers may exist on different machines. An enterprise-wide attack typically does not take place on one machine, but rather infects an entire local network at several different entry points. Thus, a single log generated by one program running on one machine may give a very narrow view of the conditions that are present, since the true usage pattern may be spread out across several machines and programs, and thus among several different logs.

Conventionally, the process of auditing does not attempt to glean context by comparing and correlating various different logs. One reason for this is that it is often difficult to determine which events in different logs correspond to the same user, because the logs tend to identify the same user differently. For example, when the user signs onto a desktop operating system (OS), and then the operating system tenders the user's credentials to a mail server to retrieve the user's mail, the OS log and the mail server log may identify that same user differently in their logs.

SUMMARY

In the subject matter described herein, event data, which can be used for audit purposes, is collected from different sources, and can then be correlated to provide an overall picture of activities that occur across different programs and machines. An "activity ID" is created for a user at the time that the user logs in, and this activity ID is passed up the stack when deeper-level programs, servers, and machines are used by the user. (E.g., if the user logs in and then retrieves mail from a mail server, the activity ID is passed to the mail server at the time that the OS tenders the user's credentials to the mail server.) The activity ID is then available for writing into the event logs by each entity that creates an event log. An overall picture of what events in different logs correspond to the same user can then be gleaned by examining the event logs and comparing activity IDs.

In addition to the use of the activity ID, event data may be correlatable by comparing identifiers such as: transaction ID, message ID, globally-unique ID (GUID), and transition ID. Event data can then be viewed and analyzed within the context of groups of machines operating within the environment.

Source labels (e.g., labels indicating the source of the event data, and such aspects as whether the source was a trusted or non-privileged source) allow varying levels of weight to be assigned to the event data. Moreover, the IDs described above that are used for correlation allow events to be sequenced, thus painting a rich picture of what is happening when the audit event was triggered (or, similarly, a rich picture of a scenario that has already occurred and is to be forensically analyzed).

Other features are described below.

DETAILED DESCRIPTION

Overview

In computer systems, auditing is traditionally performed by examining a security event log. The events in the event log are then analyzed to determine such facts as user access, user behavior, or the possibility that the system is (or was) under attack. However, modern computer systems are normally diffuse arrangements of different machines and processes, that each generate their own event log instead of using the system's security event log. In the course of using a computer, a particular user may use several programs and machines in the course of an ordinary session, and each of these programs or machines may generate its own event log. For example, a user may log in to a desktop computer, start a mail program, contact a mail server to retrieve and send mail, and access records in a database server. Each of these components may generate its own event log. Even what appears to be a single transaction (e.g., retrieving mail) may involve plural programs and/or machines (e.g., the desktop computer, the mail program, and the mail server). Thus, in order to get a complete picture of what has occurred on the machine, it may be necessary to examine each of the different event logs in context. Correlating the various event logs can be difficult, due to the fact that a single user may be identified in different ways in each event log, since each component tends to maintain its own identifier for a user. Even if it were not for the problem that it is difficult to correlate a single user across event logs, contextual analysis of events across several different logs typically is not done in present auditing practice. For example, doing something as simple as logging in and picking up a voice mail may touch three or four different servers, and it would normally be difficult to trace the same user from the time of log in until actually hearing the voice-mail message.

It is desirable to collect event data from different sources, and then correlate the data to provide an overall picture of activities that occur across different programs and machines. One way to accomplish this goal is to create an "activity ID" for a particular user, and this activity ID is passed up the stack when deeper-level programs, servers, and machines are used by the user. For example, if the user logs in and then retrieves mail from a mail server, the activity ID is passed to the mail server at the time that the OS tenders the user's credentials to the mail server. The activity ID is then available for writing into the event logs by each entity that creates an event log. An overall picture of what events in different logs correspond to the same user can then be gleaned by examining the event logs and comparing activity IDs. This information can then be overlaid on performance and traffic volume of that time period.

Other types of information, in addition to the activity ID, may also aid in correlating the event data and in painting a picture, in a larger context, of what is occurring across the boundaries of different programs and machines. Examples of such information include: a transaction ID, a message ID, a globally-unique ID (GUID), and a transition ID. Event data can then be viewed and analyzed within the context of groups of machines operating within the environment.

It is possible to assign varying weights to the different types of information, based on factors such as whether the event data comes from a trusted or untrusted source. Different weights can be assigned to the data depending on source, thereby providing further context for interpreting the wide scope of the event data. For example, data that comes from a source that is insecure, or otherwise not trustworthy, may be given lower weight than data that comes from a trusted source.

By correlating information in the various security and event logs, the data becomes more valuable than it would be by itself in terms of being able to discover what is actually happing in the system. For example, in a large network, the fact that, e.g., ten different attempts from various places have been made to open the firewall in some period of time may not be significant. However, if it could be determined that the ten different attempts were made by the same entity in a very short period of time, this fact could be subject to a different interpretation than the mere fact that ten attempts had been made from unknown sources (e.g., if the same user is attempting to open the firewall in rapid succession, this fact may suggest that the user's machine has been infected with a virus).

Further Description

The subject matter described herein is directed to contextual auditing of events that occur in a computing arrangement. The computing arrangement includes one or more computing devices, such as servers, Personal Computers (PCs), firewalls, printers, and scanners. These computing devices provide various sources of data and services to various entities. An identifier is assigned to each entity, such as the "activity ID" described below. For example, this identifier may be assigned at the time of the first sign-on in the computing arrangement. This identifier remains the same across various events performed by that entity on the various sources in the computing arrangement. This identifier helps in identifying events performed by a particular entity, thereby identifying the activities of that entity.

An entity connects to a computing device providing a particular source through a remote machine in the computing arrangement. In order to access a particular source, an entity has to be signed-on onto that source. The process of sign-on may be performed explicitly by the entity. Alternatively, the process of sign-on may be performed implicitly, wherein it is performed by the Operating System (OS) of the remote machine through which the entity is connected to the source. While accessing the source, the entity may perform various events such as opening, modifying, and printing a file stored on the source. All such events corresponding to different sources are registered as event information in individual event logs associated with a particular activity. (A machine may be engaged in many different activities with different activity identifiers; however the device identifier for a given machine would remain the same.) Information about a particular event may include, for example, a timestamp, a unique identifier for the event, the activity identifier of the entity that performed the event, the identity of the source associated with the event, and the identity of a remote machine through which the entity was connected to the source. The event logs are maintained by various data remembrance devices that are associated with the sources. Event information from the event logs is collated and analyzed to determine whether a condition that has an impact on the performance and/or security of the computing arrangement exists. For example, an entity's activities can be collated and correlated with the help of the activity identifier associated with that entity, and, subsequently, analyzed on the basis of certain policies. As the activity identifier of the entity is the same for all the sources within the computing arrangement, it is possible to correlate various events performed by the entity at different sources. In case it is determined that such a condition exists, at least one action is performed to remediate the condition.

Example Computing Arrangement

Figure 1:
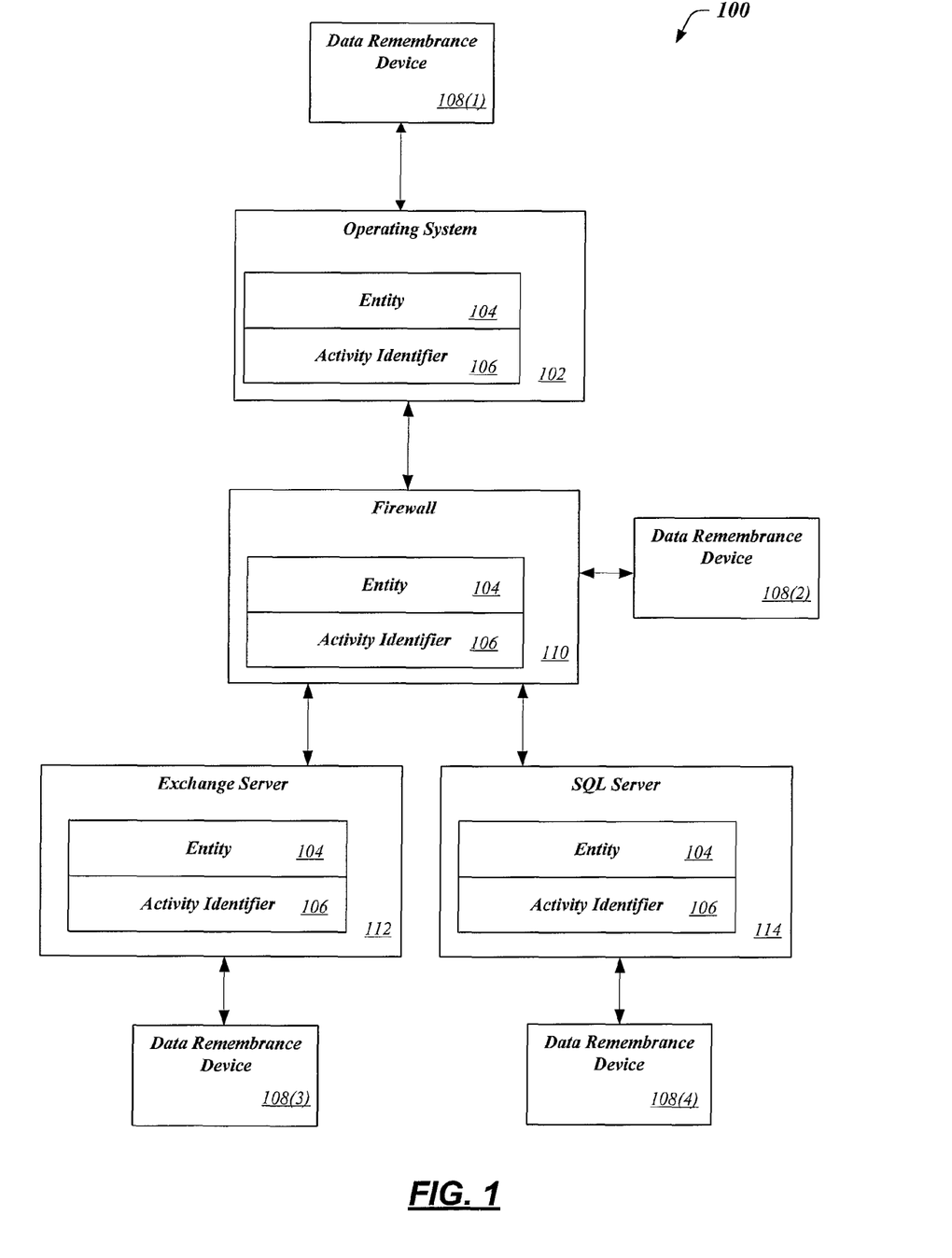
FIG. 1 is a block diagram of an example computing arrangement in which audit information may be generated, and in which contextual analysis of such audit information may occur.

FIG. 1 illustrates a computing arrangement 100. Computing arrangement 100 includes one or more computing devices (such as the computer 441 shown in FIG. 4 below)). Each of these device may provide various sources of event information. Computing arrangement 100 may be distributed among various computing devices, or, alternatively, may include a single computing device. It should be understood that the various sources shown in FIG. 1 (e.g., a firewall and an exchange server) may be running on a single computer, or may be distributed among plural connected computers. The various sources provided in computing arrangement 100 include, for example, an OS 102, a firewall 110, an exchange server 112 (which is an example of a mail server), and a database server 114 (which is an example of a database server). OS 102 is an OS running on a remote machine, from among the one or more computing devices included in computing arrangement 100, through which an entity 104 is connected. When entity 104 signs-on onto OS 102, OS 102 temporarily stores an activity identifier 106 assigned to entity 104 at a memory cache (not shown in FIG. 1) associated with OS 102. While entity 104 accesses different sources available on the remote machine, OS 102 registers events performed by entity 104 in an event log. The event log is stored at a data remembrance device 108(1) associated with OS 102.

The data remembrance device can be, for example, a magnetic disk, an optical disk, a volatile or non-volatile semiconductor memory. In general, a data remembrance device can include any device that stores data in the short or long term, but is not limited to any particular type of such device.

Entity 104 may access firewall 110 through the remote machine. OS 102 implicitly signs-on entity 104 onto firewall 110. Events performed by entity 104 at firewall 110 are registered in an event log maintained by firewall 110. This event log is stored at a data remembrance device 108(2) associated with OS 102.

In one example, entity 104 may accesses exchange server 112 through firewall 110, and is signed-on onto exchange Server 112. While entity 104 accesses various options provided by exchange server 112 (or while such access is being made transparently on entity 104's behalf), events performed by or on behalf of entity 104 at exchange server 112 are registered in an event log that is stored at a data remembrance device 108(3) associated with exchange server 112. Similarly, if entity 104 accesses database server 114 (or if an access to database server 114 is made on behalf of entity 104), then entity 104 is signed-on onto database server 114. While entity 104 executes various query options on database server 114, events performed by or on behalf of entity 104 at database server 114 are registered in an event log that is stored at a data remembrance device 108(4) associated with database server 114. Thus, several different event logs may be maintained.

Event logs may be made tamper-resistant in some manner—e.g., using techniques such as signing the log after each write, and/or making the file append-only to prevent deletion of log information. Further, the event logs can include a label to indicate security parameters associated with a particular log (or a particular event or set of events in the logs), thereby enabling policy-driven access to the information. Moreover, the security associated with each log can later be used in analyzing the information contained in a log. For example, a tamper-resistant log may be given more weight than a log that is created without tamper-resistance. Similarly, an event log that is created under circumstances that make it more likely that the log contains an accurate description of events may be given more weight in the audit analysis of the logs, and the information contained a log that is created or protected under less circumstances might be given less weight.

The event information from the event logs is collated and analyzed to determine whether a condition that impacts the performance and/or security of computing arrangement 100 exists. For example, the analysis may include analyzing events performed by entity 104, with the help of activity identifier 106. As activity identifier 106 of entity 104 is the same for all the sources within computing arrangement 100, various events performed by entity 104 at different sources can be correlated. In case it is determined that such a condition exists, at least one action is performed to remediate the condition. Details of an example analysis, determination and remediation have been provided in conjunction with FIG. 2.

Figure 2:
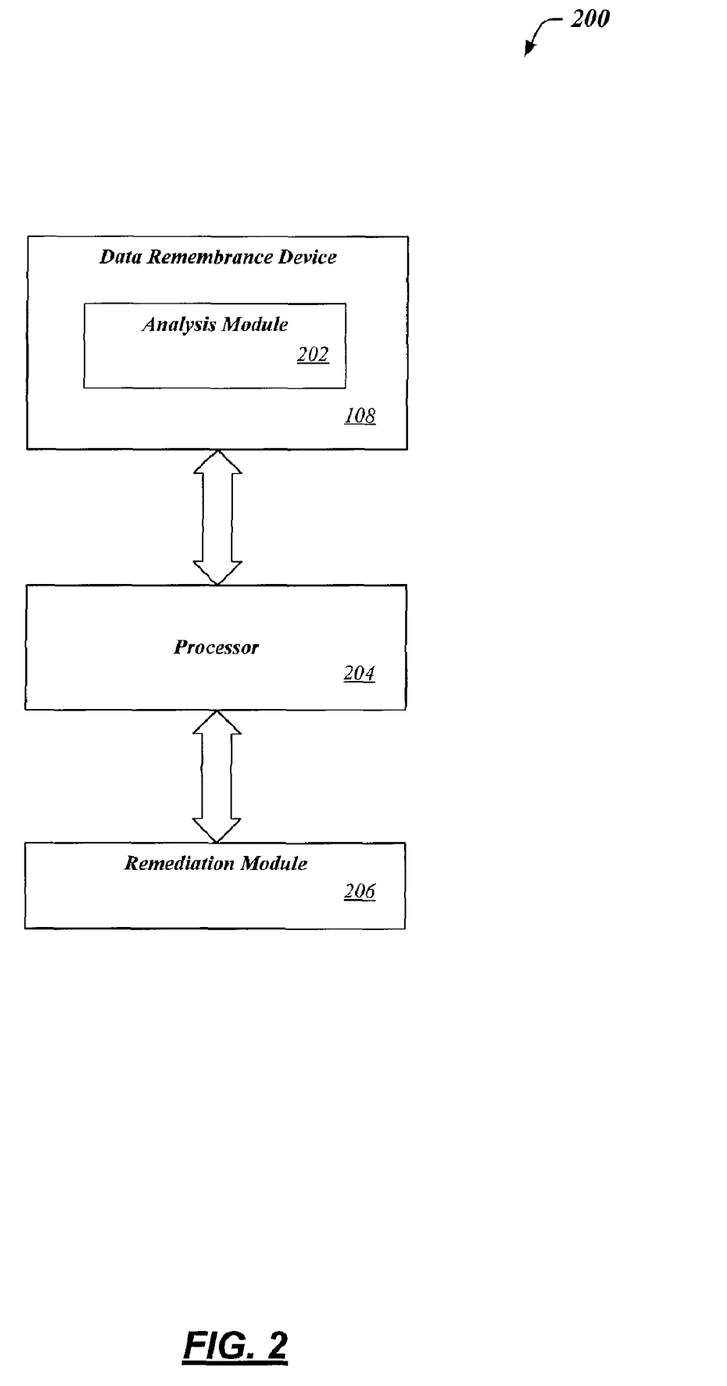
FIG. 2 is a block diagram of a system that employs components for assessing and remediating conditions within a computing environment.

FIG. 2 illustrates a system 200 in which it may be assessed whether a condition exists that has an impact on the performance and/or security of computing arrangement. System 200 (which may, for example, be the computer 441 shown in FIG. 4) includes one or more processors, one or more data remembrance devices, an analysis module 202, and a remediation module 206. System 200, in the example of FIG. 2, includes data remembrance device 108(3) and a processor 204 associated with firewall 110. Analysis module 202 is stored in a data remembrance device, e.g., data remembrance device 108 (which may, for example, be the same as the data remembrance devices shown in FIG. 1). When executed on processor 204, analysis module 202 correlates the event logs maintained in data remembrance devices 108(1)-108(4). Analysis module 202 can categorize sources that generated the events as trusted or non-trusted, based on which it may then assign different weights to event logs from different sources.

Analysis module 202 audits events by examining information contained in the event logs. Analysis module 202 attempts to analyze the information across the different event logs in context, and thus performs what may be referred to as a contextual audit. The analysis may take into account, one or more factors, such as: a timestamp, a unique identifier for an event, the activity identifier for the entity that performed the event, the identity of the source that generated the event, and the identity of a remote machine through which the entity was connected to the source. For example, events corresponding to a particular activity identifier can be analyzed to determine the behavior of the entity associated with that activity identifier. Further, the identity of the source generating the event can be taken into account to determine whether the event has been generated by a trusted source or a non-trusted source. Similarly, the identity of the remote machine through which the entity was connected to the source can be taken into account in the analysis.

Based on the contextual auditing of the correlated event logs, it is determined whether a condition that has an impact on such factors as, for example, the performance and/or security of computing arrangement 100. For example, the contextual audit may detect such conditions as: a virus attack, an automation attack, firewall manipulation, hacking of passwords, spamming, and so on.

As the activity identifier of an entity is the same for all the sources within computing arrangement 100, various events performed by that entity at different sources can be correlated. If the condition is such that remediation is appropriate, remediation module 206 performs an appropriate action to remediate the malicious behavior. For example, such remediation may include: removal or quarantine of a suspect virus, blocking network access, shutting down certain components. These are merely examples of remedial action that may be taken.

Contextual Auditing Method

Figure 3:
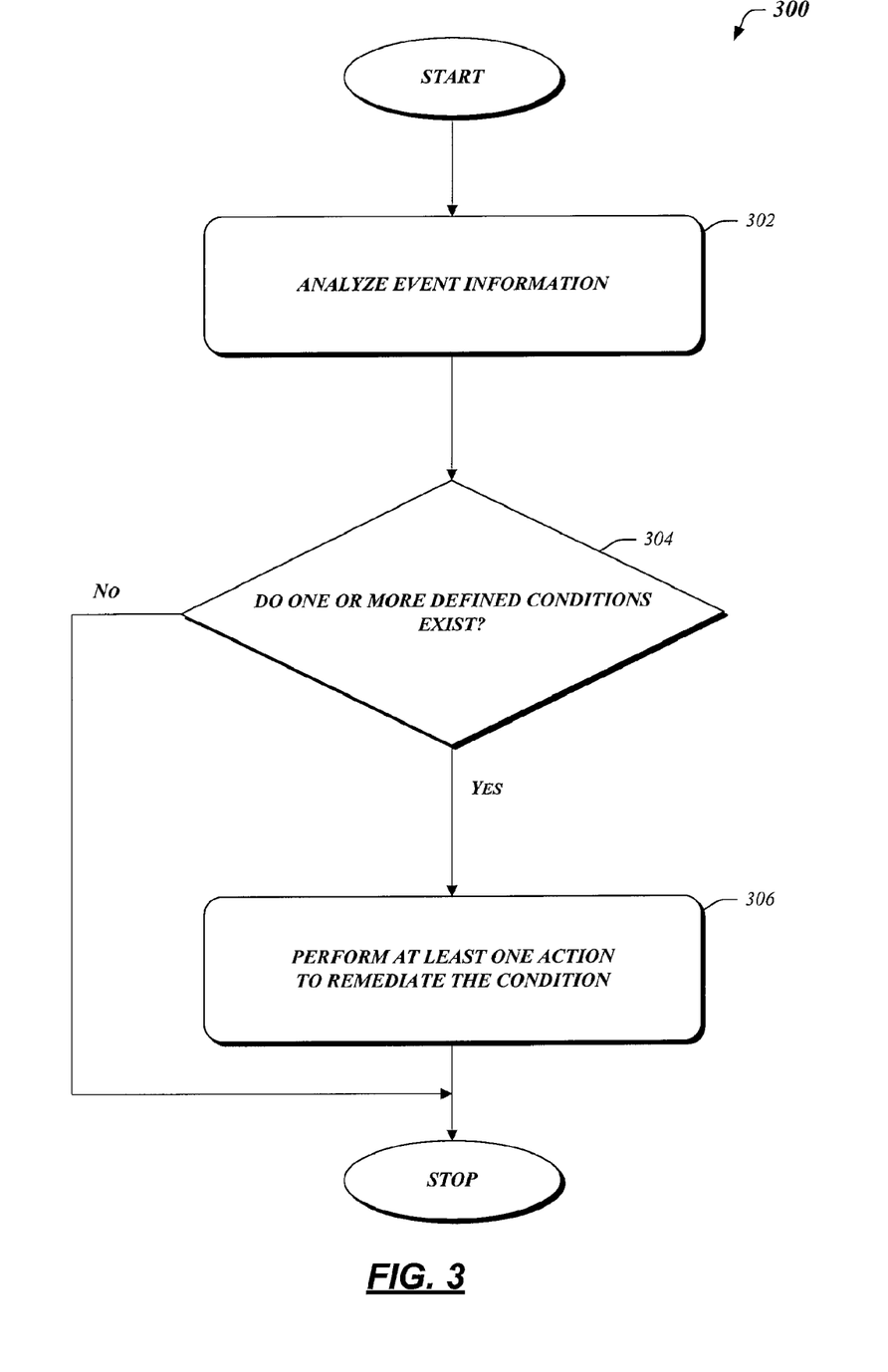
FIG. 3 is a flow diagram of assessment and remediation of a condition.

FIG. 3 illustrates a method of assessing the existence of a condition that impacts the performance and/or security of computing arrangement 100. At block 302, analysis module 202 analyzes event information occurring at a first device in computing arrangement 100, i.e., events that have occurred or are occurring at the first device are analyzed on the basis of the entities associated with the events. As each entity is identified by its activity identifier, events performed by a particular entity at different sources can be correlated. A first device is a device at which the analysis is being performed. With reference to FIG. 2, analysis module 202 is associated with firewall 110, which is the first device in this case. Analysis module 202 may take into account a timestamp associated with each event; the identity of the source associated with each event; the identity of a remote machine through which an entity was connected to the first device when the events were generated; and whether a given event was generated by a trusted or non-trusted source. Further, analysis module 202 also takes into account information about events that have occurred or are occurring at devices other than the first device within computing arrangement 100. In this way, analysis module 202 correlates the event logs generated at different devices in computing arrangement 100.

Based on the analysis performed at block 302, analysis module 202 determines whether a condition that impacts the performance and/or security of computing arrangement 100 exists (block 304). For example, in case of exchange server 112, if it is found that the number of e-mails sent by a particular entity exceeds a predefined number, analysis module 202 may take this as an indication that an attack is occurring. Similarly, if numerous attempts are made to access a firewall within some defined period of time, this fact may be viewed as a normal condition, or an indication of a system attack, depending on which entity or entities are making the attempts.

The conditions to be tested for at block 304 can be defined, for example, by a system administrator. Or, alternatively, a pre-defined set of policies can be provided with a product that incorporates the contextual analysis techniques described herein.

If it is determined that such a condition exists, block 306 is performed. At block 306, remediation module 206 performs at least one action to remediate the condition. In accordance with block 306, remediation module 206 performs at least one of the following actions: notifying a human administrator that the condition exists, disabling access rights of the entity responsible for the existence of the condition in computing arrangement 100, or limiting the access rights of the entity. In this way, remedial actions can be taken against malicious activities in real-time.

The tables below show example event logs, and how those logs may be used in connection with the process described in FIG. 3. Tables 1, 2, 3 and 4 show example event information in the event logs maintained at data remembrance devices 108(1), 108(2), 108(3), and 108(4), respectively. In this example, event information on a particular day has been considered. It should be noted that events that occurred in the past (for example, one week ago) can also be taken into consideration. The event information in these example event logs has been sorted by timestamp. This sorting is typical, since events are normally written in chronological order, although ordering by chronology is not limiting of the subject matter described herein. An example entry in the event logs follows:

TABLE 1

| Timestamp | Identifier for the Event | Activity Identifier for the Entity | Identity of the Source | Identity of the Remote Machine |
|---|---|---|---|---|
| 14/12/2006 06:00:32 AM | Opening File A | Activity Identifier 1 | OS 1 | MAC Address 1 |
| 14/12/2006 06:01:02 AM | Modifying File A | Activity Identifier 1 | OS 1 | MAC Address 1 |
| 14/12/2006 06:02:50 AM | Printing File A | Activity Identifier 1 | OS 1 | MAC Address 1 |
| 14/12/2006 07:30:00 AM | Opening File B | Activity Identifier 1 | OS 1 | MAC Address 1 |
| 14/12/2006 07:45:00 AM | Accessing Firewall | Activity Identifier 1 | OS 1 | MAC Address 1 |
| 14/12/2006 07:50:00 AM | Accessing Exchange Server | Activity Identifier 1 | OS 1 | MAC Address 1 |
| 14/12/2006 08:00:00 AM | Opening File C | Activity Identifier 2 | OS 1 | MAC Address 1 |
| 14/12/2006 08:02:00 AM | Modifying File C | Activity Identifier 2 | OS 1 | MAC Address 1 |
| 14/12/2006 08:05:00 AM | Accessing SQL Server | Activity Identifier 1 | OS 1 | MAC Address 1 |
| 14/12/2006 09:00:00 AM | Opening File D | Activity Identifier 3 | OS 1 | MAC Address 1 |
| 14/12/2006 11:00:00 AM | Opening File D | Activity Identifier 4 | OS 1 | MAC Address 1 |

TABLE 2

| 14/12/2006 00:02:00 AM | Password Success | Activity Identifier 2 | OS 2 | MAC Address 2 |
| 14/12/2006 00:05:00 AM | Password Success | Activity Identifier 3 | OS 3 | MAC Address 3 |
| 14/12/2006 00:12:00 AM | Password Success | Activity Identifier 4 | OS 4 | MAC Address 4 |
| 14/12/2006 00:15:00 AM | Password Success | Activity Identifier 5 | OS 5 | MAC Address 5 |
| 14/12/2006 06:45:00 AM | Password Success | Activity Identifier 6 | OS 6 | MAC Address 6 |
| 14/12/2006 07:45:10 AM | Password Failure | Activity Identifier 1 | OS 1 | MAC Address 1 |
| 14/12/2006 07:46:30 AM | Password Failure | Activity Identifier 1 | OS 1 | MAC Address 1 |
| 14/12/2006 07:49:00 AM | Password Success | Activity Identifier 1 | OS 1 | MAC Address 1 |

TABLE 3

| 14/12/2006 00:04:00 AM | Opening Inbox | Activity Identifier 2 | OS 2 | MAC Address 2 |
| 14/12/2006 00:06:00 AM | Opening Inbox | Activity Identifier 3 | OS 3 | MAC Address 3 |
| 14/12/2006 00:15:00 AM | Opening Inbox | Activity Identifier 4 | OS 4 | MAC Address 4 |
| 14/12/2006 00:15:30 AM | Opening Inbox | Activity Identifier 5 | OS 5 | MAC Address 5 |
| 14/12/2006 06:46:00 AM | Opening Inbox | Activity Identifier 6 | OS 6 | MAC Address 6 |
| 14/12/2006 07:50:10 AM | Opening Inbox | Activity Identifier 1 | OS 1 | MAC Address 1 |
| 14/12/2006 07:51:00 AM | Sending Mail | Activity Identifier 1 | OS 1 | MAC Address 1 |
| 14/12/2006 07:51:01 AM | Sending Mail | Activity Identifier 1 | OS 1 | MAC Address 1 |
| 14/12/2006 07:51:02 AM | Sending Mail | Activity Identifier 1 | OS 1 | MAC Address 1 |
| 14/12/2006 07:51:03 AM | Sending Mail | Activity Identifier 1 | OS 1 | MAC Address 1 |
| 14/12/2006 07:51:04 AM | Sending Mail | Activity Identifier 1 | OS 1 | MAC Address 1 |
| 14/12/2006 07:51:05 AM | Sending Mail | Activity Identifier 1 | OS 1 | MAC Address 1 |
| 14/12/2006 07:51:06 AM | Sending Mail | Activity Identifier 1 | OS 1 | MAC Address 1 |
| 14/12/2006 07:51:07 AM | Sending Mail | Activity Identifier 1 | OS 1 | MAC Address 1 |

TABLE 4

| 14/12/2006 00:02:30 AM | Select Query on Table A | Activity Identifier 2 | OS 2 | MAC Address 2 |
| 14/12/2006 00:04:00 AM | Update Query on Table A | Activity Identifier 2 | OS 2 | MAC Address 2 |
| 14/12/2006 00:06:06 AM | Update Query on Table B | Activity Identifier 3 | OS 3 | MAC Address 3 |
| 14/12/2006 00:12:30 AM | Select Query on Table B | Activity Identifier 4 | OS 4 | MAC Address 4 |
| 14/12/2006 00:16:00 AM | Select Query on Table C | Activity Identifier 5 | OS 5 | MAC Address 5 |
| 14/12/2006 00:17:00 AM | Update Query on Table C | Activity Identifier 5 | OS 5 | MAC Address 5 |
| 14/12/2006 07:00:00 AM | Select Query on Table D | Activity Identifier 6 | OS 6 | MAC Address 6 |
| 14/12/2006 08:05:10 AM | Select Query on Table A | Activity Identifier 1 | OS 1 | MAC Address 1 |
| 14/12/2006 08:06:10 AM | Delete Query on Table B | Activity Identifier 1 | OS 1 | MAC Address 1 |
| 14/12/2006 08:07:00 AM | Insert Query on Table C | Activity Identifier 1 | OS 1 | MAC Address 1 |
| 14/12/2006 08:08:50 AM | Insert Query on Table D | Activity Identifier 1 | OS 1 | MAC Address 1 |
| 14/12/2006 08:09:20 AM | Update Query on Table E | Activity Identifier 1 | OS 1 | MAC Address 1 |

In order to perform contextual analysis, Tables 1, 2, 3 and 4 may be collated into a single event log, or alternatively, may be viewed in parallel by an analysis module (such as analysis module 202, shown in FIG. 2), without the need to create a separate collated table. For illustration purposes, Table 5 shows entries corresponding to 'Activity Identifier 1' only, although it will be understood that Table 5 could be a table that is actually created from Tables 1-4 and separately stored, or could simply be a view of information contained in Tables 1-4.

TABLE 5

| 14/12/2006 06:00:32 AM | Opening File A | Activity Identifier 1 | OS 1 | MAC Address 1 |
| 14/12/2006 06:01:02 AM | Modifying File A | Activity Identifier 1 | OS 1 | MAC Address 1 |
| 14/12/2006 | Printing File A | Activity | OS 1 | MAC Address 1 |

TABLE 5-continued

| | | | | |
|---|---|---|---|---|
| 06:02:50 AM | | Identifier 1 | | |
| 14/12/2006 07:30:00 AM | Opening File B | Activity Identifier 1 | OS 1 | MAC Address 1 |
| 14/12/2006 07:45:00 AM | Accessing Firewall | Activity Identifier 1 | OS 1 | MAC Address 1 |
| 14/12/2006 07:45:10 AM | Password Failure | Activity Identifier 1 | OS 1 | MAC Address 1 |
| 14/12/2006 07:46:30 AM | Password Failure | Activity Identifier 1 | OS 1 | MAC Address 1 |
| 14/12/2006 07:49:00 AM | Password Success | Activity Identifier 1 | OS 1 | MAC Address 1 |
| 14/12/2006 07:50:00 AM | Accessing Exchange Server | Activity Identifier 1 | OS 1 | MAC Address 1 |
| 14/12/2006 07:50:10 AM | Opening Inbox | Activity Identifier 1 | OS 1 | MAC Address 1 |
| 14/12/2006 07:51:00 AM | Sending Mail | Activity Identifier 1 | OS 1 | MAC Address 1 |
| 14/12/2006 07:51:01 AM | Sending Mail | Activity Identifier 1 | OS 1 | MAC Address 1 |
| 14/12/2006 07:51:02 AM | Sending Mail | Activity Identifier 1 | OS 1 | MAC Address 1 |
| 14/12/2006 07:51:03 AM | Sending Mail | Activity Identifier 1 | OS 1 | MAC Address 1 |
| 14/12/2006 07:51:04 AM | Sending Mail | Activity Identifier 1 | OS 1 | MAC Address 1 |
| 14/12/2006 07:51:05 AM | Sending Mail | Activity Identifier 1 | OS 1 | MAC Address 1 |
| 14/12/2006 07:51:06 AM | Sending Mail | Activity Identifier 1 | OS 1 | MAC Address 1 |
| 14/12/2006 07:51:07 AM | Sending Mail | Activity Identifier 1 | OS 1 | MAC Address 1 |
| 14/12/2006 08:05:00 AM | Accessing SQL Server | Activity Identifier 1 | OS 1 | MAC Address 1 |
| 14/12/2006 08:05:10 AM | Select Query on Table A | Activity Identifier 1 | OS 1 | MAC Address 1 |
| 14/12/2006 08:06:10 AM | Delete Query on Table B | Activity Identifier 1 | OS 1 | MAC Address 1 |
| 14/12/2006 08:07:00 AM | Insert Query on Table C | Activity Identifier 1 | OS 1 | MAC Address 1 |
| 14/12/2006 08:08:50 AM | Insert Query on Table D | Activity Identifier 1 | OS 1 | MAC Address 1 |
| 14/12/2006 08:09:20 AM | Update Query on Table E | Activity Identifier 1 | OS 1 | MAC Address 1 |

When the event information in Table 5 is analyzed, it can be seen that the entity associated with 'Activity Identifier 1' has attempted to gain access to firewall 110 and has been successful, which may be an indication of an illicit access. It is also seen that the same entity has sent several mails at approximately the same time, and has also made changes in Tables B, C, D and E at database server 114 (of which the SQL server mentioned in the logs is an example). If the entities action is determined to be malicious, remedial action could be taken, such as notifying an administrator.

Example Computing Environment

Figure 4:
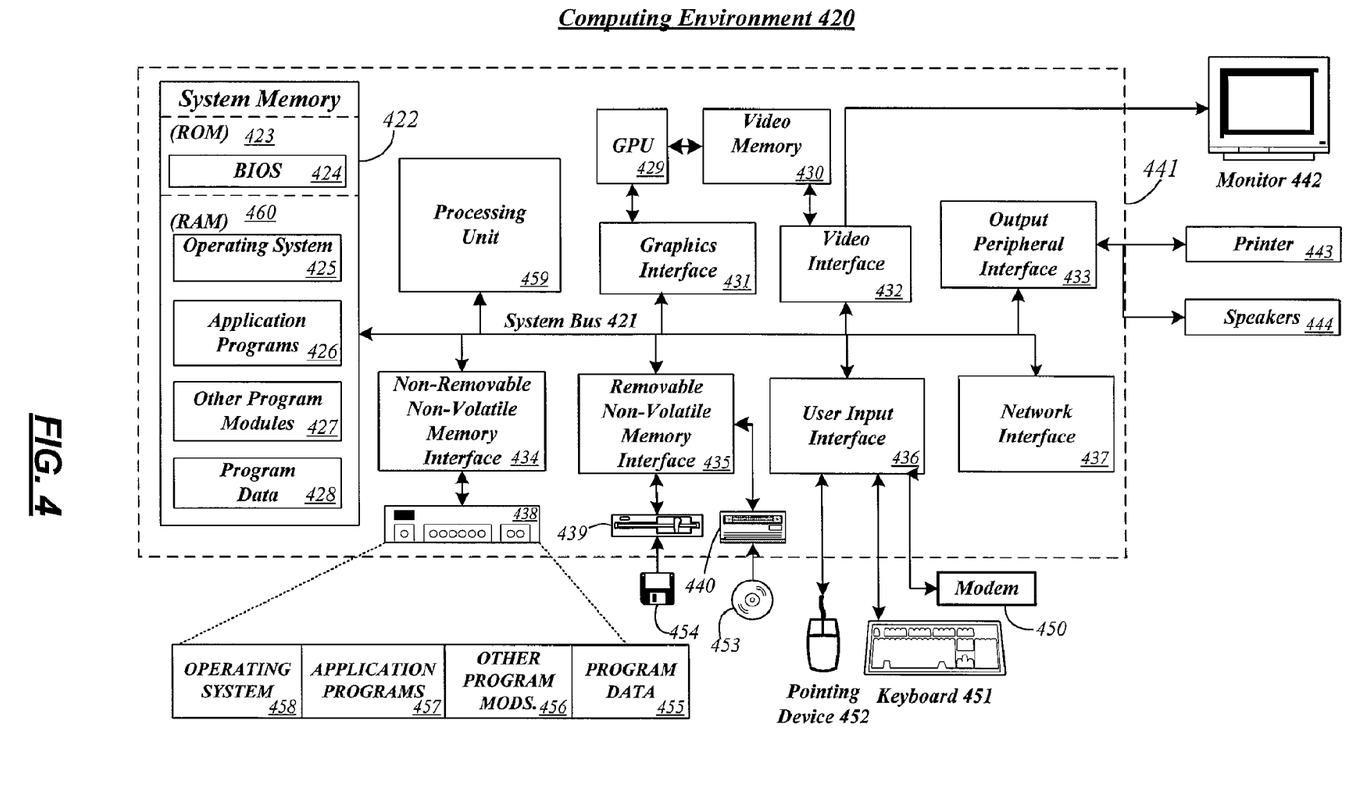
FIG. 4 is a block diagram of a computing environment in which aspects of the subject matter described herein may be deployed.

Referring to FIG. 4, shown is a block diagram representing an example computing device. The computing system environment 420 is only one example of a suitable computing environment and is not intended to suggest any limitation as to the scope of use or functionality of the subject matter disclosed herein. Neither should the computing environment 420 be interpreted as having any dependency or requirement relating to any one or combination of components illustrated in the example operating environment 420.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 441. Components of computer 441 may include, but are not limited to, a processing unit 459, a system memory 422, and a system bus 421 that couples various system components including the system memory to the processing unit 459. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 441 typically includes a variety of computer readable media. Computer readable media can be any available media that can be accessed by computer 441 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 441. Communication media typically embodies computer readable instructions, data structures, program modules or other data in a modulated data signal such as a carrier wave or other transport mechanism and includes any information delivery media. The term "modulated data signal" includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during startup, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/nonremovable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of assessing the existence of a condition that has an impact on performance or security of a computing arrangement, the method comprising:
  receiving, at a first device, event information from a plurality of sources, said plurality of sources comprising a first source and a second source, said first and second sources requiring sign-on by an entity in order to be used, said event information comprising a plurality of events, each of said plurality of events having an identifier tied to the respective sign-on, said identifier being created at time of a sign-on into said computing arrangement, said identifier being identical for said plurality of events performed by said entity across various sources in said computing arrangement, said event information including information generated by said first source and by said second source;
  analyzing said event information at said first device;
  determining that said condition exists based on said analyzing, said determining being based at least in part on a finding that said plurality of events originating from said first and second source pertain to the same entity, said finding being made based on said identifier being the same in each of said two events; and
  performing at least one action to remediate said condition.

2. The method of claim 1, said analyzing taking into account a timestamp associated with each of said plurality of events.

3. The method of claim 1, said analyzing taking into account the identity of the source associated with each event.

4. The method of claim 1, said analyzing taking into account the identity of a remote machine from which said entity was connected to said first device when each of said plurality of events was generated.

5. The method of claim 1, said events being generated by both trusted and non-trusted sources, and said analyzing taking into account whether a given event was generated by a trusted or non-trusted source.

6. The method of claim 1, said analyzing taking into account information about events that are occurring or have occurred at devices, within said computing arrangement, other than said first device.

7. The method of claim 1, said performing at least one action to remediate said condition comprising notifying a human administrator that said condition exists.

8. The method of claim 1, said computing arrangement being said first device.

9. The method of claim 1, said computing arrangement comprising a network of connected computing devices including said first device.

10. A system for assessing whether a condition exists that has an impact on performance or security of a computing arrangement, the system comprising:
    one or more processors;
    one or more data remembrance devices;
    an analysis module that is stored in at least one of said data remembrance devices and executable on at least one of said one or more processors, said analysis module receiving event information from a plurality of sources, the plurality of sources comprising a first source and a second source, said first and second sources requiring sign-on by an entity in order to be used, said event information comprising a plurality of events, each of said plurality of events having an identifier tied to the respective sign-on, said identifier being created at time of a sign-on into said computing arrangement, said identifier being identical for said plurality of events performed by said entity across various sources in said computing arrangement, said event information including information generated by said first source and by said second source;
    said analysis module further analyzes event information occurring at said first device, said analysis module determining whether said condition exists based analysis of the event information including a finding that two different events originating from said first and second source pertain to the same entity, said finding being made based on said identifier being the same in each of said two events; and
    a remediation module that performs at least one action to remediate the condition if the condition exists.

11. The system of claim 10, said events being generated by both trusted and non-trusted sources, and said analysis module taking into account whether a given event was generated by a trusted or non-trusted source.

12. The system of claim 10, said analysis module taking into account information about events that are occurring or have occurred at devices, within said computing arrangement, other than said first device.

13. The system of claim 10, the remediation module notifying a human administrator that said condition exists.

14. The system of claim 10, said computing arrangement being said first device.

15. The method of claim 10, said computing arrangement comprising a network of connected computing devices including said first device.

16. One or more computer-readable storage devices encoded with computer-executable instructions to perform a method of assessing the existence of a condition that has an impact on performance or security of a computing arrangement, the method comprising:
    receiving, at a first device, event information from a plurality of sources, the plurality of sources comprising a first source and a second source, said first and second sources requiring sign-on by an entity in order to be used, said identifier is being created at time of a sign-on into said computing arrangement, said event information comprising a plurality of events, each of said plurality of events having an identifier tied to the respective sign-on, said identifier being identical for said plurality of events performed by said entity across various sources in said computing arrangement, said event information including information generated by said first source and by said second source;
    analyzing said event information at said first device;
    determining that said condition exists based on said analyzing, said determining being based at least in part on a finding that said plurality of events originating from said first and second source pertain to the same entity, said finding being made based on said identifier being the same in each of said two events; and
    performing at least one action to remediate said condition.

17. The one or more computer-readable storage devices of claim 16, said analyzing taking into account a timestamp associated with each of said plurality of events.

18. The one or more computer-readable storage devices of claim 16, said analyzing taking into account the identity of a remote machine from which said entity was connected to said first device when each of said plurality of events was generated.

19. The one or more computer-readable storage devices of claim 16, said events being generated by both trusted and non-trusted sources, and said analyzing taking into account whether a given event was generated by a trusted or non-trusted source.

20. The one or more computer-readable storage devices of claim 16, said analyzing taking into account information about events that are occurring or have occurred at devices, within said computing arrangement, other than said first device.

* * * * *